No. 722,231. PATENTED MAR. 10, 1903.
R. W. E. HAYES.
CULTIVATOR COUPLING.
APPLICATION FILED AUG. 21, 1901.
MODEL. 2 SHEETS—SHEET 1.
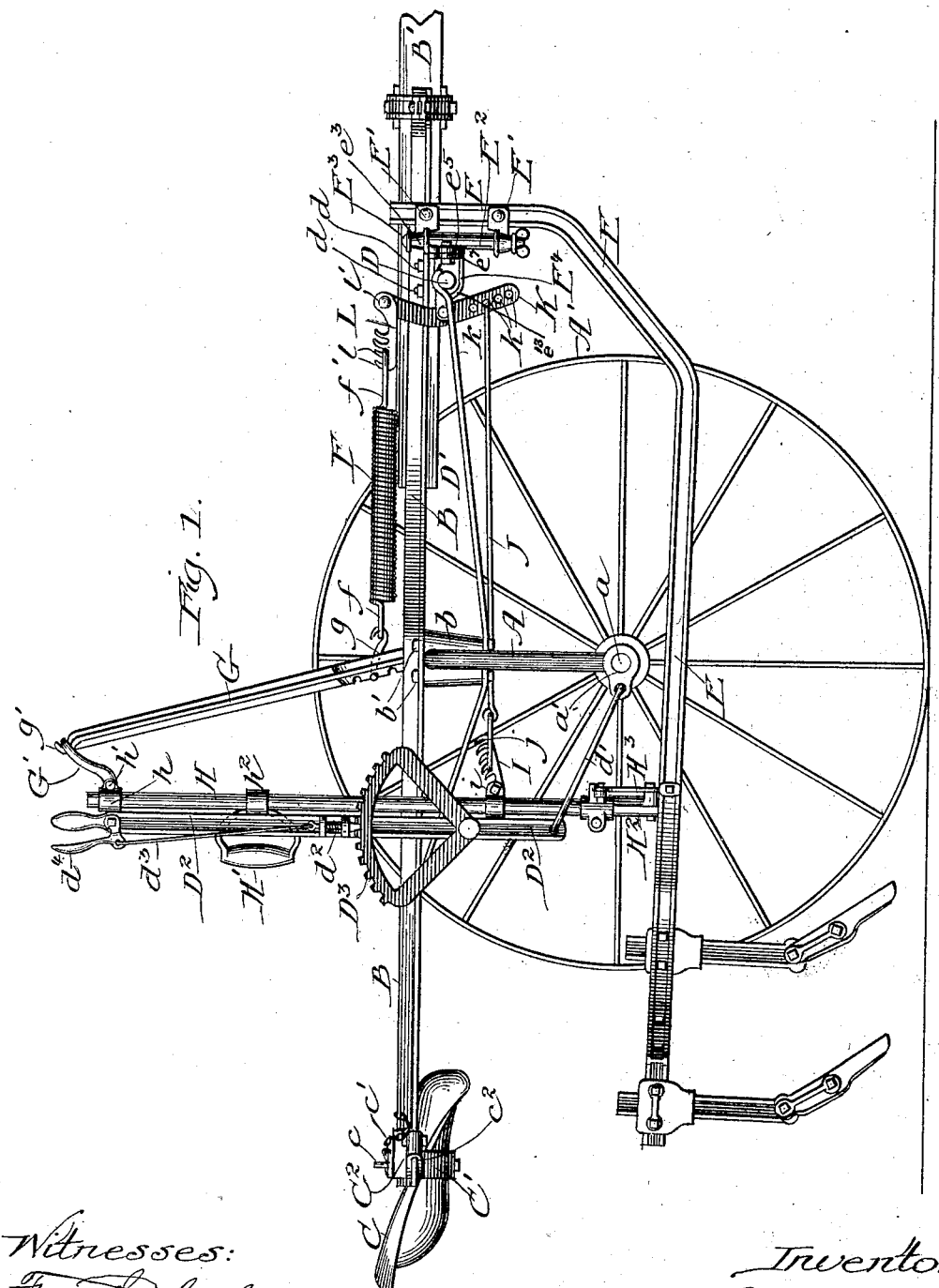
Witnesses:
Frank Blanchard
Oscar W. Bond
Inventor:
Ralph W. E. Hayes.
By Banning & Banning,
Attorneys.

No. 722,231. PATENTED MAR. 10, 1903.
R. W. E. HAYES.
CULTIVATOR COUPLING.
APPLICATION FILED AUG. 21, 1901.
MODEL. 2 SHEETS—SHEET 2.
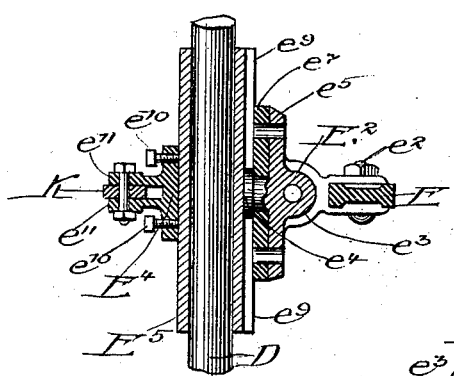
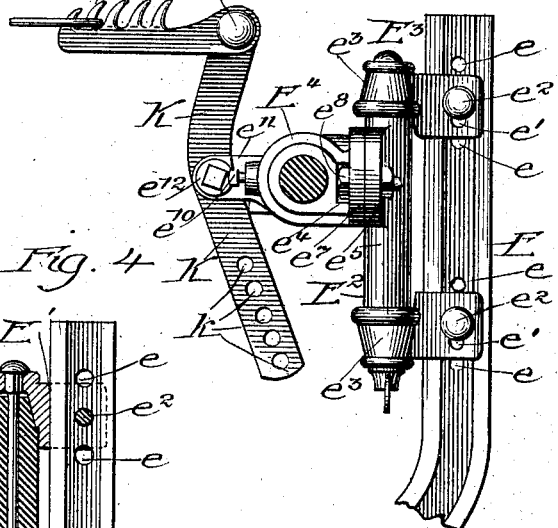
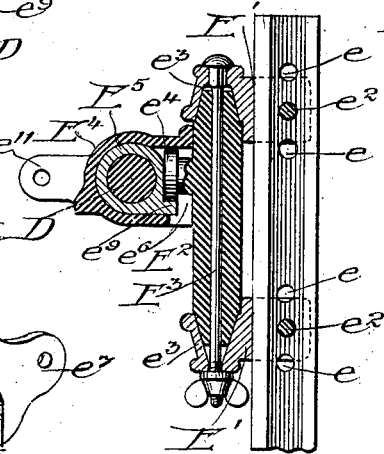
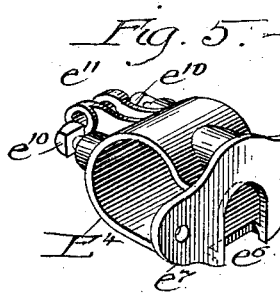
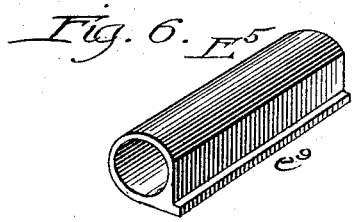
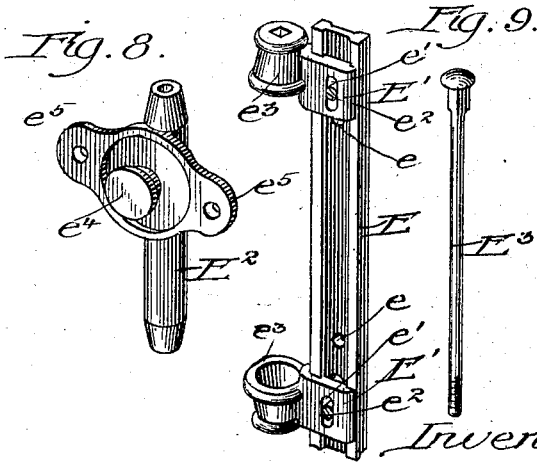
Witnesses:
Frank S. Blanchard
Oscar W. Bond
Inventor:
Ralph W. E. Hayes.
By Banning & Banning,
Attorneys.

ated by the invention.

UNITED STATES PATENT OFFICE.

RALPH W. E. HAYES, OF GALVA, ILLINOIS.

CULTIVATOR-COUPLING.

SPECIFICATION forming part of Letters Patent No. 722,231, dated March 10, 1903.

Original application filed March 14, 1901, Serial No. 51,080. Divided and this application filed August 21, 1901. Serial No. 72,783. (Model.)

*To all whom it may concern:*

Be it known that I, RALPH W. E. HAYES, a citizen of the United States, residing at Galva, in the county of Henry and State of Illinois, have invented certain new and useful Improvements in Cultivator-Couplings, of which the following is a specification, the same being a division of my application, Serial No. 51,080, filed March 14, 1901.

The invention relates especially to the connection or coupling for the forward end of the plow-beam with the frame and is designed more particularly for use with riding-cultivators, but can be applied to and used with walking or combined walking and riding cultivators.

The objects of the invention are to improve the coupling for attaching the forward end of the plow-beam with the main frame, so as to enable the beam to be swung laterally and raised vertically; to insure the sustaining of the beam upright at its forward end or front coupling; to enable the plow-beam to be locked by the coupling at the forward end, so as to have a vertical and lateral swing, and to be released from the lock, so as to have an oscillation or swing on a pivot, and to improve generally the construction and operation of the coupling at the forward end of the beam.

The invention consists in the features of construction and combinations of parts hereinafter described and claimed.

In the drawings illustrating the invention a cultivator in all of its details is not shown, as it is only deemed necessary to show a cultivator to an extent sufficient for defining and pointing out the invention and its manner of application and use.

In the drawings, Figure 1 is a side elevation with one of the wheels removed and the forward end of the tongue broken off; Fig. 2, a sectional detail of the coupling, constituting the subject-matter of the invention, for the forward end of the plow-beam, with the spindle or horizontal end of the arched carrying-bar in plan; Fig. 3, a side elevation of the coupling, showing also the equalizing and depth-controlling lever and connection between the coupling and the suspending devices for the rear end of the beam, which features, however, do not enter into the present invention; Fig. 4, a detail in section of the coupling for the forward end of the plow-beam, showing the beam in elevation; Fig. 5, a perspective view of one section of the coupling for the forward end of the beam; Fig. 6, a perspective view of the pipe-box forming a part of the coupling for the forward end of the beam; Fig. 7, a perspective view showing the forward end of the plow-beam and the supporting-cups therefor; Fig. 8, a perspective view of the sleeve pivoted in the supporting-cups and forming the pivot on which the plow-beam swings horizontally and having the pivot on which the beam oscillates, and Fig. 9 a perspective view of the pivoting-bolt for the sleeve of Fig. 8.

The cultivator is constructed with an arched axle A, the upper portion of the arch constituting a support for the main frame and the lower horizontal portions on each side forming the spindles $a$ for receiving the wheels A', which are secured thereon in any usual and well-known manner, with the inner end of the wheel-hub abutting against a cap or band $a'$ on the spindle.

The main frame B is formed of a flanged metal bar on each side and extending front and rear of the axle-arch and attached to the horizontal portion of the axle-arch by a block $b$ and bolts $b'$ or in any suitable manner, and between the frame-pieces at the front end is secured the tongue B' in any suitable manner.

The seat C is located at the rear end of the main frame and is mounted on a cross-bar or spring C', and the ends of the bar or spring C' are each attached to a head C² by means of a pin or bolt $c$, passing through a hole in the spring end and the head and the side bar of the frame, and one of the attaching bolts or pins can be connected by a chain $c'$ with the side bar of the frame, and, as shown, the head or block has in its rear edge face a slot $c^2$ in which to enter the end of the spring, so that the seat can be adjusted higher or lower by securing the ends of the bar or spring on top of the blocks or in the slots, as may be desired.

A cross-bar or coupling-axle D is located at the forward end of the main frame and is attached to the frame by stirrup-bolts $d$, encircling the cross-bar or coupling-axle and passing through the side bars of the main frame. The cross-bar or coupling-axle has its outer end on each side connected with the arch of the axle by a brace D', the forward end of the brace having an eye or loop encircling the outer end of the cross-bar or coupling-axle and secured thereto by a bolt or otherwise, and the rear end of the brace abuts against the lower end of the supporting-block $b$ and is held in place by the clamping-bolts $b'$, which attach the main frame to the arch of the axle.

The wheel band or box $a'$ on one of the axle-spindles has connected therewith one end of a link $d'$, the other end of which is entered into the end of a regulating-lever $D^2$, pivotally attached to a segmental rack $D^3$ and extending up so as to be within reach of the operator or driver riding on the seat. The notches of the segmental rack are engaged by a sliding bolt $d^2$, mounted on the regulating-lever and actuated by a rod $d^3$ and releasing-lever $d^4$, pivoted to the regulating-lever at the upper end, so that by releasing the regulating-lever from the segmental rack and moving it forward or back the angling relation of the arched axle can be changed as may be desired to enable operators of different weights to balance the cultivator.

The plow-beams E, one on each side, in the construction shown each carry shovel-standards at the rear end. The forward end of each beam is upwardly inclined and terminates in a vertical end. The vertical end of each plow-beam is entered between receiving plates or clasps E', bolted to the beam end by suitable bolts $e^2$, passing through adjusting-holes $e$ in the beam end and through a slot $e'$ in each plate or clasp, by means of which holes and attaching plates or clasps the height of the beam at the forward end can be regulated. Each receiving plate or clasp E' has at its rear side a cup or cone shaped bearing $e^3$, between which is mounted a sleeve $E^2$, the ends of the sleeve having a cone shape to fit the bearing, and the sleeve is held in place between the bearings by a pivoting-bolt $E^3$, so as to permit the sleeve to turn in the bearings. The sleeve on its rear face is provided with a headed stud or pin $e^4$ and with side ears $e^5$ for attachment of the coupling section or collar $E^4$, which has a vertical slot or recess $e^6$ for the passage of the headed stud or pin $e^4$ and has ears $e^7$ coinciding with the ears $e^5$ and the ears $e^5$ and $e^7$ having coinciding holes for the passage of bolts $e^8$, by means of which the sleeve and coupling section or collar can be locked rigidly one with the other, so as to have a fixed relation, or by removing the clamping-bolts $e^8$ the sleeve and coupling section or collar become disconnected, so that the sleeve can turn or swing on the coupling section or collar through the headed stud or pin uniting the two. The coupling section or collar $E^4$ receives a pipe-box $E^5$, entered onto the lower horizontal end of the swinging supporting-bar D, and the coupling section or collar is locked to the pipe-box by set-bolts $e^{10}$, passing through the wall of the coupling section or collar and engaging the pipe-box. The pipe-box has a flange $e^9$, which when the parts are together forms a stop against the withdrawal of the headed stud from the receiving slot or recess in the coupling section or collar by engaging the periphery of the head of the stud or pin, so that the stud or pin forms a pivot for the sleeve. It will be seen that when the parts are together and the pipe-box is mounted on the end of the cross-bar or coupling-axle a connection is furnished by means of which the beam is free to be raised and lowered by the turning of the pipe-box on the horizontal end of the cross-bar or coupling-axle, and with the clamping-bolts in place the coupling section or collar and the sleeve oscillate together on the end of the arched bar with the rising-and-falling movement of the beam; but with the parts disconnected by the removal of the clamping-bolts the sleeve has a lateral swing on the stud or pin in addition to the vertical swing on the arched bar, giving the beam when the sleeve and coupling section or collar are disconnected both a vertical swing and a lateral swing on the coupling connection as a whole.

A coiled spring F is provided for each plow-beam, and each spring at its rear end has an eye or loop $f$ to engage with a hook $g$ at the lower end of a swinging or rocking arm G, mounted on the arched axle, so as to be free to rock and swing. The upper end of each rocking or swinging arm has a hook $g'$ for the attachment of a link G', connecting the arm with a clasp $h$ on the spindle or upright H, the clasp having a clamping-bolt $h'$ for attaching it to the spindle or upright and for the attachment of the end of the link. Each spindle has attached thereto by a clasp $h^2$ a handle H', and each standard at its lower end is attached to the plow-beam by a pivoted plate $H^2$ and a fixed plate $H^3$, provided with connecting-ears and locking-bolts, which, however, form no part of the present invention and are not herein specifically described, the same being shown and described in detail in the application Serial No. 51,080, of which this is a division. A plate I, having notches $i$, is attached to each standard or upright and receives into its notches a loop $j$, connected with a rod J, and the other end of the rod J is connected with one of a series of holes $k$ in an equalizing and depth-controlling lever K, pivotally mounted between ears $e^{11}$ on the coupling section or collar $E^4$ by a pivot pin or bolt $e^{12}$, so that the lever is free to swing on the pivot pin or bolt. On the coupling section or collar $E^4$ is a lug or stop $e^{13}$, against which the equalizing and depth-controlling lever strikes, so as to limit the movement of the lever on the pivot in a definite direction only. The series of holes $k$ in the lower end of the equalizing and depth-controlling lever for the attachment of the end of the rod enables a higher or lower point of connection of the rod with the lever to be made, as may be required in operation. The upper end of the lever K has a plate L pivoted thereto by a pivoting bolt or pin $l'$, and this plate has a series of notches $l$ to receive a hook or eye $f'$ at the forward end of the coiled spring F, so that the coiled spring is connected at one end with the equalizing and depth-controlling lever and at the opposite end with the rocking arm, and the rocking arm is connected with the standard or upright, which in turn is connected with the plow-beam and also connected by the rod J with the equalizing and depth-controlling lever. These parts and their purpose and operation pertain to the subject-matter of the application of which this is a division and are not, therefore, herein specifically described.

The coupling at the forward end of each plow-beam, in connection with the swinging or rocking arm and the suspending-link, with the standard or upright, furnishes a suspension for the beam, and the construction of coupling at the forward end thereof enables the beam to be raised and lowered vertically and to be swung laterally or sidewise perfectly free, and at the same time the lateral swing of the beam is controlled through the coupling, so as to have a movement in a straight horizontal plane or with a swing on the arc of a circle, according to the condition of the coupling in connection with the attachment of the standard or upright to the beam. A lateral or side swing in a straight plane will be had with the pivoting-sleeve and the coupling section or collar for the front coupling rigidly connected together, so as to form, in effect, one piece for the beam to swing laterally on the sleeve as a pivot and with the connection between the pivot-plate and the fixed plate for the lower end of the standard or upright and the plow-beam for the plate to swing on its pivot independent of the fixed plate attached to the plow-beam. The disconnecting of the pivoting-sleeve from the coupling section or collar of the front coupling enables a side or lateral swing for the plow-beam on the arc of a circle to be attained, as with the parts in this position the sleeve can turn laterally on its connecting stud or pins, with the pivoting-plate for the lower end of the standard and the plate attached to the plow-beam rigidly connected together, so as to form, in effect, one piece. It will thus be seen that the plow-beam is free to rise and fall vertically on the sleeve for the coupling section or collar and can also be made to swing laterally in a straight plane or on the arc of a circle, so that with the coupling of the construction of this invention the plow-beam can be raised and lowered and swung laterally or sidewise either in a straight horizontal plane or on the arc of a circle, as may be desired. The locking-ears and the clamping-bolts for the ears furnish a connection between the vertical pivoting-sleeve and the coupling section or collar by which the two can be rigidly connected, or the sleeve can have a rocking movement on the coupling section or collar by moving the bolts, thus enabling the coupling to be adjusted for swinging the beam laterally or sidewise in a straight horizontal plane or on the arc of a circle.

What I claim as new, and desire to secure by Letters Patent, is—

1. In a cultivator, the combination of a plow-beam, a clasp for the front end of the plow-beam, a vertical pivoting-sleeve carried by the clasp and having a headed stud and locking-ears, a coupling-collar having a receiving-slot for the headed stud and locking-ears coinciding with the locking-ears of the vertical sleeve, and clamping-bolts for the locking-ears, substantially as described.

2. In a cultivator, the combination of a plow-beam, a clasp for the front end of the plow-beam, a vertical pivoting-sleeve carried by the clasp and having a headed stud and locking-ears, a coupling-collar having a receiving-slot for the headed stud and locking-ears coinciding with the locking-ears of the vertical sleeve, clamping-bolts for the locking-ears, and a pipe-box entered into the coupling-collar and having a side flange engaging the head of the stud, substantially as described.

3. In a cultivator, the combination of a main frame, a plow-beam, an arched bar carried by the main frame, a clasp for the front end of the plow-beam, a vertical pivoting-sleeve carried by the clasp and having a headed stud and locking-ears, a coupling-collar having a recess receiving the headed stud and having locking-ears coinciding with the locking-ears of the vertical sleeve, clamping-bolts for the locking-ears, and a pipe-box entered into the coupling-collar and mounted on the horizontal end of the arched bar and provided with a flange engaging the head of the stud, substantially as described.

4. In a cultivator, the combination of a plow-beam journaling on a vertical pivoting-sleeve having a stud, a coupling-collar having a receptacle for the stud, and means for clamping the vertical pivoting-sleeve to the coupling-collar, substantially as described.

5. In a convertible, horizontal and vertical pivot for the front end of a cultivator-beam, the combination of a cross-bar on the front end of the cultivator-frame, a coupling-collar having journaled to it a vertical sleeve in which the vertical extension of the plow-beam turns, and means for holding the vertical sleeve from rotating in respect to the coupling-collar, substantially as described.

6. In a convertible horizontal pivot and vertical pivot for the front end of a cultivator-beam, the combination of a cross-shaft on the front end of the cultivator-frame, a coupling-collar on the cross-shaft having therein a receiving-slot, a vertical sleeve on which a vertical extension of the beam journals, a stud on the sleeve entered into the receiving-slot of the coupling-collar, and means for holding the stud from turning in its bearing, substantially as described.

7. In a convertible horizontal pivot and vertical pivot for the front end of a cultivator-beam, the combination of a cross-shaft on the front end of the cultivator-frame, a coupling-collar on the cross-shaft having therein a slot, a sleeve forming a bearing for the vertical extension of the beam, a stud on the sleeve journaled in the slot of the coupling-collar, ears on the coupling-collar, ears on the sleeve coinciding with the ears on the coupling-collar when the sleeve is vertical, and means for fastening the ears of the sleeve to the ears of the coupling-collar, substantially as described.

8. In a convertible horizontal pivot and vertical pivot for the front end of a cultivator-beam, the combination of a cross-shaft on the front end of the cultivator-frame, a coupling-collar on the cross-shaft having therein a slot, a sleeve having a stud journaled in the slot of the coupling-collar, clamps on the sleeve receiving and holding a vertical extension of the cultivator-beam, and means preventing the stud of the sleeve from turning in the coupling-collar on the cross-shaft, substantially as described.

9. In a convertible horizontal pivot and vertical pivot for the front end of the cultivator-beam, the combination of a cross-shaft on the front end of the cultivator-frame, a coupling-collar on the cross-shaft, a sleeve having a stud journaled in the coupling-collar, retaining-clamps for the sleeve receiving and holding a vertical extension of the cultivator-beam, means preventing the stud of the sleeve from turning in the coupling-collar on the cross-shaft, substantially as described.

RALPH W. E. HAYES.

Witnesses:
OSCAR W. BOND,
SAMUEL W. BANNING.